United States Patent
Sun et al.

(10) Patent No.: US 10,931,487 B2
(45) Date of Patent: Feb. 23, 2021

(54) CHIP FAILURE DETECTION METHOD AND DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jian Sun, Beijing (CN); Lin Lin, Beijing (CN); Ziqiang Guo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/585,415

(22) Filed: Sep. 27, 2019

(65) Prior Publication Data
US 2020/0235964 A1 Jul. 23, 2020

(30) Foreign Application Priority Data
Jan. 22, 2019 (CN) .......................... 201910059367.3

(51) Int. Cl.
H04L 25/49 (2006.01)
H04L 1/20 (2006.01)

(52) U.S. Cl.
CPC ............ *H04L 25/4904* (2013.01); *H04L 1/20* (2013.01)

(58) Field of Classification Search
CPC .............................. H04L 25/4904; H04L 1/20
See application file for complete search history.

(56) References Cited

U.S. PATENT DOCUMENTS

| | | | | |
|---|---|---|---|---|
| 4,031,328 A * | 6/1977 | Pitroda | .................. | H04M 3/569 370/261 |
| 6,008,746 A * | 12/1999 | White | .................. | H04L 25/4904 341/70 |
| 2010/0073211 A1* | 3/2010 | Smith | ..................... | H04L 25/14 341/141 |
| 2018/0176041 A1* | 6/2018 | Yue | ......................... | H04L 25/08 |

FOREIGN PATENT DOCUMENTS

CN 104270155 A 1/2015

* cited by examiner

*Primary Examiner* — Dac V Ha
(74) *Attorney, Agent, or Firm* — Myers Bigel, P.A.

(57) ABSTRACT

Embodiments herein provide a method for detecting a failure of a chip. The method includes dividing a plurality of channels of the chip into multiple channel groups, providing an input bit stream to each channel group of the multiple channel groups and monitoring whether there is a difference between an output bit stream of each channel in the channel group and the input bit stream, and determining based on the difference whether each of the multiple channel groups is an abnormal channel group. Input bit streams provided to respective channels in a same channel group are identical.

17 Claims, 6 Drawing Sheets

CHIP FAILURE DETECTION METHOD AND DEVICE

RELATED APPLICATION

The present application claims the benefit of Chinese Patent Application No. 201910059367.3, filed on Jan. 22, 2019, the entire disclosure of which is incorporated herein by reference.

TECHNICAL FIELD

The present disclosure relates to the field of computer technologies, and especially to a method and device for detecting a failure of a chip.

BACKGROUND

With the rapid development of computer technologies, processor chip devices such as an application processor (AP), a field programmable gate array (FPGA), and the like have been widely used.

The chip devices such as AP and FPGA are powerful, which have thousands of pins and achieve data control and data transmission through multiple output channels. Once these chip devices have abnormal states, such as timing misalignment, signal distortion, etc., it is often difficult to locate abnormal positions. If abnormal positions of a chip device are manually tested and located, the testing workload would be too great due to a large number of channels. It is difficult to manually test the individual output pins one by one to determine the faulted channels. In addition, manual testing requires a probe to be connected to the pins of the chip device. The chip device is usually packaged in a form of ball grid array (BGA), a printed circuit board (PCB) comprising the chip device has a compact layout, and most leads connected with the pins of the chip device are located inside the circuit board, with no external testing line or testing point configured. Due to the above factors, it is difficult to connect a probe for testing. Therefore, in case an abnormality occurs in the chip device, the implementability of manually testing and locating an abnormal position is very poor.

SUMMARY

An embodiment of the present disclosure provides a method for detecting a failure of a chip, the method comprising: dividing a plurality of channels of the chip into multiple channel groups; providing an input bit stream to each channel group of the multiple channel groups and monitoring whether there is a difference between an output bit stream of each channel in the channel group and the input bit stream, input bit streams provided to respective channels of a same channel group being identical; and determining, based on the difference, whether each channel group of the multiple channel groups is an abnormal channel group.

In some embodiments, the monitoring whether there is the difference between the output bit stream of each channel in the channel group and the input bit stream comprises: comparing the input bit stream with the output bit stream of each channel in the channel group under a same clock signal, the difference indicating that the input bit stream being different from the output bit stream within a single clock cycle of the clock signal.

In some embodiments, the determining, based on the difference, whether each channel group of the multiple channel groups is the abnormal channel group comprises: recording, for each channel group of the multiple channel groups, a number of times the difference occurs; and identifying a channel group among the multiple channel groups in which the number of times the difference occurs is greater than a predetermined value as the abnormal channel group.

In some embodiments, the method further comprises recording time when the difference occurs for the abnormal channel group.

In some embodiments, each channel group of the multiple channel groups comprises N channels, and the recording, for each channel group of the multiple channel groups, the number of times the difference occurs comprises: recording the number of times the difference occurs in the N channels of each channel group by high k bits of a first register having a bit width of (N+k), and storing output bit streams of the N channels by low N bits of the first register, where N is an integer greater than or equal to 2, and k is an integer greater than or equal to 1.

In some embodiments, the identifying the channel group among the multiple channel groups in which the number of times the difference occurs is greater than the predetermined value as the abnormal channel group comprises: in response to the number of times the difference occurs recorded by the high k bits of the first register being equal to $2^k-1$, identifying the channel group corresponding to the first register as the abnormal channel group.

In some embodiments, the recording time when the difference occurs for the abnormal channel group comprises: counting a clock signal of the input bit stream to record a clock count value when the abnormal channel group is determined; and storing, by a second register, a product of a clock cycle of the clock signal and the clock count value as the time when the difference occurs.

In some embodiments, the plurality of channels of the chip are divided into M channel groups, the providing the input bit stream to each channel group of the multiple channel groups and monitoring whether there is the difference between the output bit stream of each channel in the channel group and the input bit stream comprises: providing the input bit stream to the M channel groups simultaneously, and recording a number of times the difference occurs for each channel group of the M channel groups, respectively; or providing the input bit stream to the M channel groups successively, and recording a number of times the difference occurs for the M channel groups.

In some embodiments, the method further comprises: dividing channels of the abnormal channel group into a plurality of sub-channel groups; and detecting an abnormal sub-channel group from the plurality of sub-channel groups.

In some embodiments, the method further comprises detecting respective channels of the abnormal channel group one by one to determine an abnormal channel where a failure occurs.

In some embodiments, the method further comprises encoding a pseudo-random sequence to generate the input bit stream that is provided to each channel group of the multiple channel groups.

In some embodiments, the encoding the pseudo-random sequence to generate the input bit stream that is provided to each channel group of the multiple channel groups comprises: performing Manchester encoding for an m-sequence to generate the input bit stream.

In some embodiments, the k is an integer greater than or equal to 2.

Another embodiment of the disclosure provides a device for detecting a failure of a chip, the device comprising: a grouping module configured to divide a plurality of channels of the chip into multiple channel groups; a monitoring module configured to provide an input bit stream to each channel group of the multiple channel groups and monitor whether there is a difference between an output bit stream of each channel in the channel group and the input bit stream, and a determining module configured to determine, based on the difference, whether each channel group of the multiple channel groups is an abnormal channel group.

In some embodiments, the device further comprises a time recording module configured to record time when the difference occurs for the abnormal channel group.

Another embodiment of the disclosure provides a detection apparatus comprising a processor, the processor being configured to execute the method according to any of the foregoing embodiments.

Yet another embodiment of the present disclosure provides a storage medium comprising executable instructions, the executable instructions, when executed by a processor, implement the method according to any of the foregoing embodiments.

BRIEF DESCRIPTION OF THE DRAWINGS

The drawings are intended to provide a further understanding of the technical solutions of embodiments of the disclosure and constitute a part of the specification, which illustrate the technical solutions of embodiments herein together with the literal description of the present application, rather than limit the scope of the present application.

DETAILED DESCRIPTION OF EMBODIMENTS

To make the purpose, technical solutions and advantages of embodiments of the present disclosure clearer, the embodiments of the present disclosure will be described in detail below with reference to the accompanying drawings. It is to be noted that, in the case of causing no conflict, embodiments in the present disclosure and the features in the embodiments may be arbitrarily combined with each other to obtain other different embodiments. These other embodiments do not depart from the gist of the disclosure and fall within the scope of the application.

The steps illustrated in the flow charts of the drawings may be executed by a computer system such as a set of computer executable instructions. Moreover, although logic orders are shown in the flow charts, in some cases, the steps shown or described may be performed in an order different from the ones described herein.

The failure detection method proposed by embodiments of the disclosure may be applied to various types of chip devices, including but not limited to an FPGA and an AP. The FPGA or AP mentioned in the description below is only for the purpose of illustrating the embodiments of the disclosure, and does not limit the scope of the application.

Figure 1:
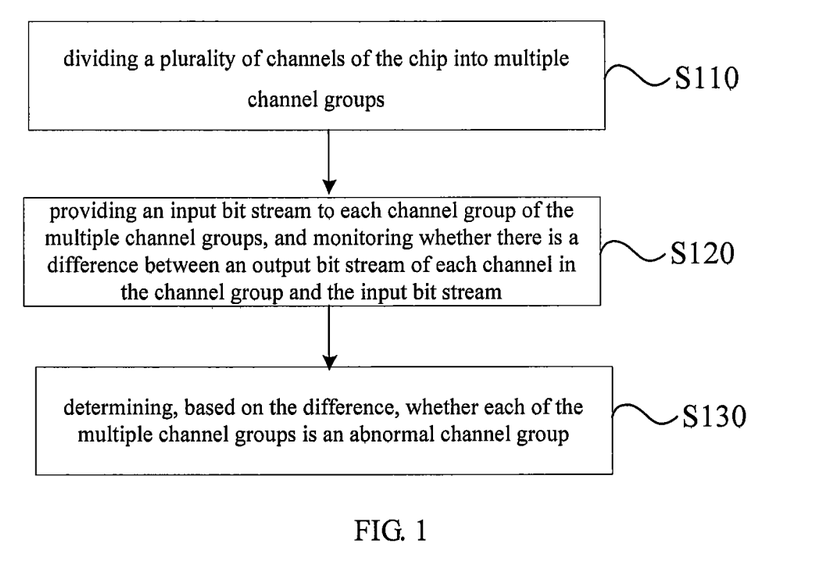
FIG. 1 is a flow chart of a method for detecting a failure of a chip as provided by an embodiment of the present disclosure.

FIG. 1 is a flow chart of a method for detecting a failure of a chip as provided by an embodiment of the present disclosure. The failure detection method provided by the embodiment is capable of detecting and locating an abnormal state of a chip such as an AP or an FPGA. The method may comprise the following steps: S110, dividing a plurality of channels of the chip into multiple channel groups; S120, providing an input bit stream to each channel group of the plurality of channel groups, and monitoring whether there is a difference between an output bit stream of each channel in each channel group and the input bit stream; and S130, determining, based on the difference, whether each channel group of the plurality of channel groups is an abnormal channel group. In step S120, the input bit streams provided to respective channels in the same channel group are the same.

With the failure detection method provided by the embodiment of the disclosure, the cause of an abnormal state of the chip can be analyzed, and the position where an abnormality occurs in the chip can be determined. In particular, for processor chips with a large number of internal channels, such as an AP, an FPGA, etc., these chip devices usually have thousands of pins and a large number of channels. Especially, if the chip is packaged in a form of ball grid array (BGA) and the printed circuit board comprising the chip has a very compact layout, it is difficult to test the chip with a multimeter or an oscilloscope. With the method provided by the embodiment of the disclosure, it is convenient to test the chips where failures occur, and the failure detection efficiency can be improved.

In the embodiment of the present disclosure, a plurality of channels inside a chip device are detected group by group. For example, all the channels in the chip are divided into a multiple channel groups, each of which comprises a plurality of channels, and bit streams are input to these channel groups for failure detection. In some embodiments, a chip device (which is, for example, an FPGA) may be connected to a measurement device through an emulator. The measurement device is, for example, a computer. A user may group the channels of the FPGA using the measurement device, and may also write programs with the measurement device, so that the measurement device inputs the bit streams to the channel groups through the logic pins of the FPGA. In some embodiments, the same bit stream may be provided to a plurality of channels in the same channel group, and the input bit stream for the plurality of channels in the same channel group may be input simultaneously. The above-mentioned input bit stream is known input data, and output bit streams from the plurality of channels in the same channel group may be somewhat different from the input bit stream.

In some embodiments, the number of times the output bit stream of each channel in the same channel group differs from the input bit stream can be recorded, and whether this channel group is an abnormal channel group can be determined accordingly.

In some embodiments, monitoring whether there is a difference between an output bit stream of each channel in each channel group and the input bit stream may comprise: comparing the input bit stream with the output bit stream of each channel in each channel group under the same clock signal, the difference indicating that the input bit stream is different from the output bit stream within a single clock cycle of the clock signal. For example, at the time of comparing the output bit streams of a plurality of channels in the same channel group with the input bit stream, each time a difference between the input bit stream and the output bit stream is obtained by comparison, an abnormality can be recorded. A condition for determining an abnormal channel group may be that the above abnormality is detected several times. In case the abnormality has been recorded several times for a channel group and the recorded number of abnormality meets the above condition for determining an abnormal channel group, this channel group is determined as an abnormal channel group. Thus, each channel group in the chip device can be detected and abnormal channel groups can be located and marked.

In an embodiment of the disclosure, the comparison between the output bit stream and the input bit stream is performed for the same channel group. For the same channel group, the bit streams input to a plurality of channels in the channel group are the same and are also input simultaneously, that is, the timing of the bit streams provided to respective channels in this channel group is the same. At the time of determining a difference between the output bit stream and the input bit stream, the output bit stream of each channel in this channel group needs to be compared with the input bit stream. Therefore, in the above example, the input bit stream can be considered as a reference bit stream, the reference bit stream is provided to each channel in the same channel group, and the output bit streams from respective channels of the channel group may be different from the input bit stream at a certain point in time due to factors such as clock problems, channel abnormalities, process to the input bit stream by the channels, etc., that is, a difference between the input bit stream and the output bit streams occurs. Therefore, determining the difference between the output bit stream and the input bit stream is performed for the same bit stream input to the same channel group at the same time. The output bit stream of any channel in this channel group being different from the input bit stream will count as one difference. That is, the number of differences is recorded for the entire channel group, not for a certain channel. In addition, embodiments of the present disclosure do not limit the forms of bit streams input to different channel groups, that is, the bit streams input to different channel groups may be the same or different.

If the abnormal positions of a chip device are tested and located manually, it is difficult to detect a large number of channels in the chip device one by one, and it is difficult to perform testing using a multimeter or an oscilloscope by connecting a probe. In contrast, the failure detection method provided by the embodiment of the disclosure performs detection based on channel groups, the output bit streams of a plurality of channels in the same channel group are compared with the input bit stream provided for this channel group to thereby determine whether there is a difference between the output bit stream of each channel in each channel group and the input bit stream. Then it can be determined, based on the difference, whether each of the plurality of channel groups is an abnormal channel group. In an embodiment, the number of times the difference occurs may be recorded, and it is determined whether each channel group is abnormal based on the recorded number of times the difference occurs.

When the method provided by the above embodiment of the present disclosure is used to perform failure detection for the channels in a chip device (for example, an FPGA chip including thousands of channels), comparison between the input bit stream and the output bit streams is performed for each channel group on the basis that all the channels of the chip device have been divided into groups, and those channel groups for which the above difference does not occur may be firstly determined as channels with no failure, thus, the range of locating an abnormal channel can be greatly reduced. In some embodiments, on the basis that the abnormal channel groups have been located, it is possible to change the way of grouping the channels and modify the condition for determining whether a channel group is an abnormal channel group, then repeatedly perform the above steps S110, S120 and S130 to finally determine one or more channels with failures.

According to some embodiments of the present disclosure, monitoring whether there is a difference between the output bit stream of each channel in each channel group and the input bit stream in the above step S120 comprises: comparing the input bit stream with the output bit stream of each channel in each channel group under the same clock signal, the difference indicating that the input bit stream being different from the output bit stream within a single clock cycle of the clock signal. For example, the fact the input bit stream and the output bit stream of each channel have different waveforms within a single clock cycle of the above clock signal may indicate that the above difference has occurred.

In some embodiments, the above step S130 of determining, based on the difference, whether each of the plurality of channel groups is an abnormal channel group comprises the following processes: S1301, recording for each channel group of the plurality of channel groups the number of times the difference occurs; S1302, identifying a channel group for which the number of times the difference occurs is greater than a predetermined value as an abnormal channel group. For example, the same input bit stream may be provided to a plurality of channels in the same channel group among a plurality of channel groups of a chip device, and the input bit stream and the output bit streams are compared to record the number of times the difference occurs between the output bit streams of the plurality of channels in each channel group and the input bit stream. When the recorded number of times the difference occurs for a channel group exceeds the predetermined value, the channel group is identified as an abnormal channel group, thereby reducing the range of locating an abnormal channel in the chip device.

Figure 2:
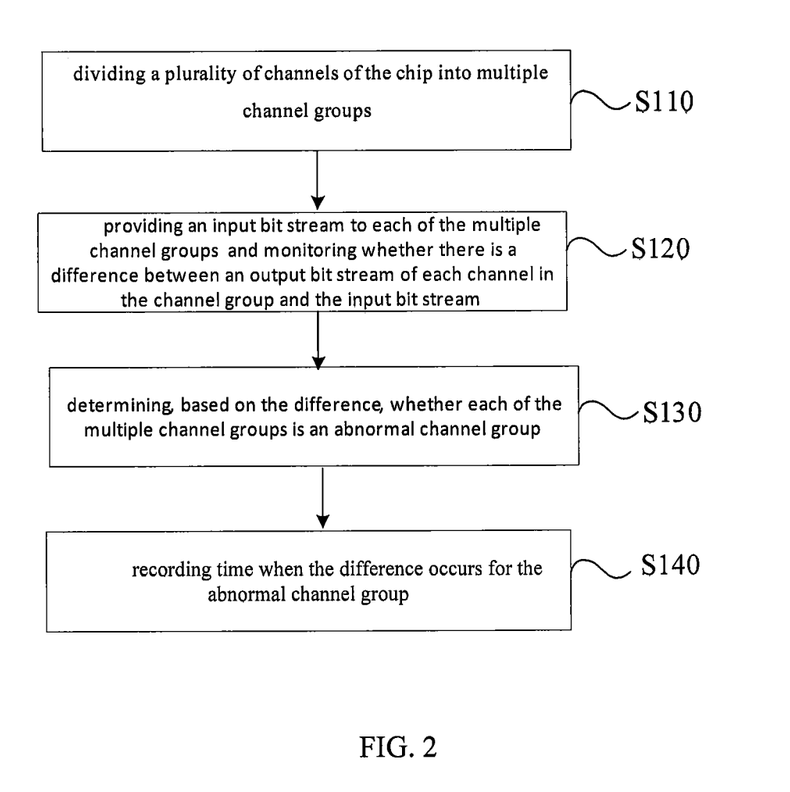
FIG. 2 is a flow chart of a method for detecting a failure of a chip as provided by another embodiment of the present disclosure.

FIG. 2 is a flow chart of a method for detecting a failure in a chip as provided by another embodiment of the present disclosure. On the basis of the embodiment shown in FIG. 1, the failure detection method provided by the embodiment of the disclosure further comprises: S140, recording time when the difference occurs for the abnormal channel group. In some embodiments, during the process of identifying an abnormal channel group, a channel group for which the above difference only occurs once may not be determined as an abnormal channel group in the channel group, instead, the channel group will be determined as an abnormal channel group only if the recorded number of times the difference occurs meets the condition for abnormality (for example, the number of times the difference occurs is greater than a predetermined value). Meanwhile, the time when the difference occurs is recorded for the abnormal channel group. That is, in this embodiment, for those channel groups not identified as abnormal channel groups, the time when the difference occurs would not be recorded. For example, a channel group comprises five channels, and the input bit stream for the channel group is provided to the five channels simultaneously. The input bit stream has a certain length, and the timings of the input bit stream for the five channels are the same. After the input bit stream passes through the five channels, output bit streams having a certain length are output from the five channels simultaneously, that is, the timings of the output bit streams of the five channels are also the same. The input bit stream is compared with the output bit streams of the five channels of the channel group under the same clock signal, and the input bit stream differing from an output bit stream within a single clock cycle of the clock signal means that the difference occurs. For example, the input bit stream in the first clock cycle is compared with the five output bit streams in the first clock cycle, respectively, and as long as the content of one of the five output bit streams is different from the input bit stream during the first clock cycle, it will count as one difference. The above comparison is performed within every clock cycle of the input bit stream until the content of the input bit stream has been compared with the contents of the output bit streams in all the clock cycles.

In the embodiment of the disclosure, recording for the abnormal channel group the time (which may also be referred to as an abnormal time position) when the difference occurs may reduce the range of time to be detected at the time of subsequently determining a specific channel where a failure occurs. For example, to perform further detection to the abnormal channel group subsequently, it is possible to only detect the content of the output bit streams in time periods before and after the recorded abnormal time position, so that subsequent location of specific time when the abnormality occurs in a specific failed channel can be expedited. In addition, if a previously recorded abnormality does not reappear, the events occurring at the recorded abnormal time position may be considered to determine the cause of the abnormality.

According to an embodiment of the present disclosure, the method for detecting a failure of a chip further comprises encoding a pseudo-random sequence to generate the input bit stream provided to each channel in a channel group of the chip device.

In an embodiment of the disclosure, the input bit stream provided to a channel group for comparison with output bit streams of a plurality of channels in this channel group may be generated by encoding a pseudo-random sequence. The pseudo-random sequence, also known as a pseudo-noise or pseudo-random code, has both a random characteristic (i.e., statistical property) of a random sequence, and pre-determinacy, which can be repeatedly generated and replicated. For the above characteristics of the pseudo-random sequence, the pseudo-random sequence can be used as the basic bit stream for comparison and detection in the embodiments of the disclosure.

In an embodiment, Manchester encoding may be performed for an m-sequence to generate the input bit stream. The m-sequence is the longest linear feedback shift register (LFSR) sequence, which is a kind of pseudo-random sequence. The LFSR sequence has characteristics of randomness, regularity, good self-correlation and cross-correlation. Moreover, the LFSR sequence has a large key amount, hence with which digital signal is encrypted is safe and stable. The LFSR sequence is often used in data links of a communication system.

The above-mentioned pseudo-random sequence (for example, m-sequence) may be encoded by Manchester Encoding, also called phase encoding (PE), which is a synchronous clock encoding technique (self-synchronization method). There is a transition in each bit of the code. This transition is used as both a clock signal and a data signal. That is, a synchronization information can be extracted from the code itself and the clock pulse frequency can be locked. In addition, the code does not contain DC components and thus has a good anti-interference performance.

Figure 3:
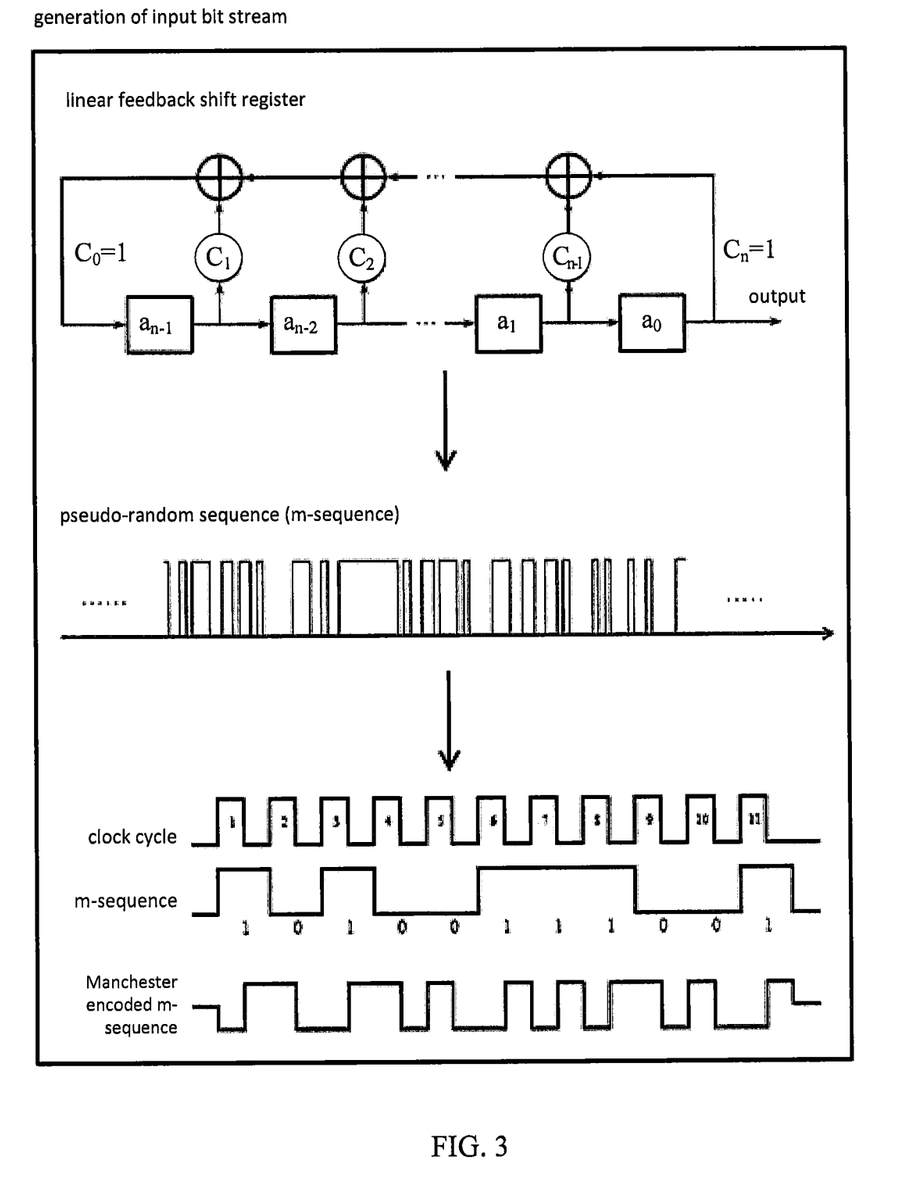
FIG. 3 is a schematic view illustrating a process of generating an input bit stream in a method for detecting a failure of a chip as provided by an embodiment of the present disclosure.

FIG. 3 schematically shows a process of generating an input bit stream according to an embodiment of the disclosure. Firstly, a shift register with linear feedback generates a maximum cycle sequence, i.e. an m-sequence. The corresponding number of taps or the order of the source equation (e.g., $a_0$ to $a_{n-1}$ in FIG. 3 means n-order) may be set by a user by reference to the capability of a chip. For example, reference may be made to channels' capabilities to decode and encode the input bit stream in an FPGA to be tested (the output bit streams may be stored and compared in the FPGA), and the operational capability of the FPGA may also be considered. The m-sequence is then subjected to Manchester encoding in accordance with the IEEE 802.3 protocol of the Institute of Electrical and Electronics Engineers (IEEE) to generate an input bit stream to be provided to each channel group to be detected. The IEEE 802.3 protocol defines that, the "low→high" level transition denotes "1", and the "high→low" level transition denotes "0". If Manchester encoding is performed in accordance with other protocols, the level transitions are defined by the protocols.

In the embodiment of the disclosure, a bit stream generated by performing Manchester encoding for a pseudo-random sequence (for example, m-sequence) is used as the input bit stream provided to each channel group to be detected. The m-sequence undergone Manchester encoding has a good anti-interference capability, which may ensure its own stability and is applicable to detecting. The input bit stream may be transmitted simultaneously in respective channels of the same channel group, and compared with the output bit streams to find the above-mentioned differences. As a result, the range of locating abnormal positions can be quickly reduced, so that the specific position of a failure can be quickly and accurately located in the chip.

It is to be noted that, the above embodiment of the disclosure is illustrated by taking an example in which a bit stream generated by performing Manchester encoding for the m-sequence is used as the input bit stream. In practical applications, embodiments of the disclosure do not limit specific forms of the input bit streams provided to respective channels of the channel groups. The input bit streams may also be bit streams generated from performing other types of encoding for other pseudo-random sequences. For example, a Gold code, a PN code, or the like in pseudo-random sequences may also be used, and a differential Manchester encoding may be feasible for encoding theses codes.

Figure 5:
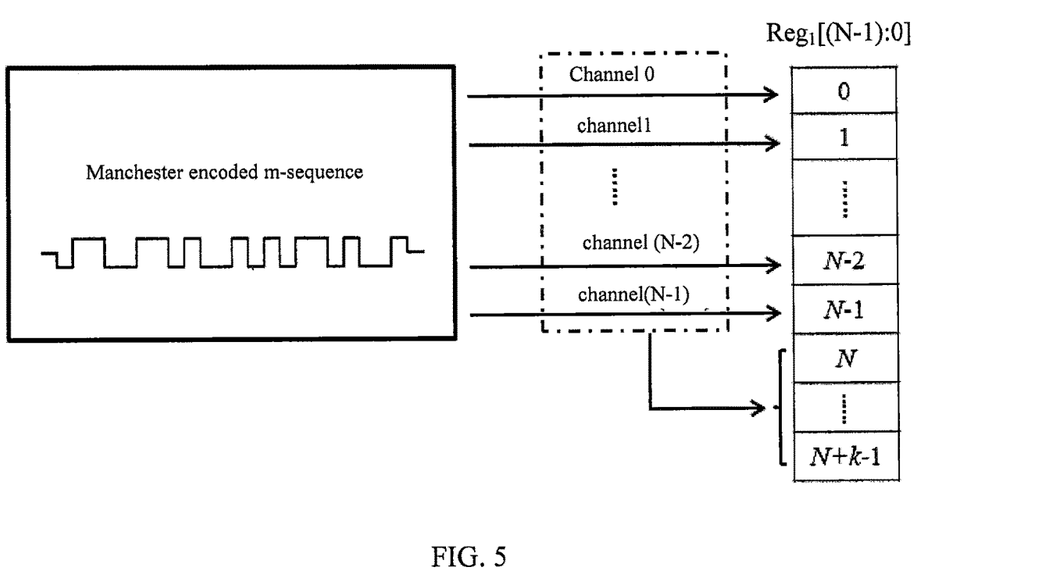
FIG. 5 is a schematic view illustrating an application scenario of recording the number of times the difference occurs in a channel group as provided by an embodiment of the present disclosure.

According to some embodiments of the present disclosure, each channel group of a plurality of channel groups obtained by dividing the channels of a chip comprises N channels. The above step S1301 "recording for each channel group of the plurality of channel groups the number of times the difference occurs" comprises: recording a number of times the difference occurs in the N channels in each channel group using high k bits of a first register having a bit width of (N+k), and storing output bit streams of the N channels using low N bits of the first register, where N is an integer greater than or equal to 2, and k is an integer greater than or equal to 1. In this case, the above step S1302 "identifying a channel group for which the number of times the difference occurs is greater than a predetermined value as the abnormal channel group" may comprise: in response to the number of times the difference occurs recorded by the high k bits of the first register being equal to $2^{k-1}$, identifying a channel group corresponding to the first register as the abnormal channel group. FIG. 5 is a view illustrating an application scenario of recording the number of times the difference occurs in a channel group in the chip failure detection method as provided by an embodiment of the disclosure. In the embodiment of the disclosure, transmission channels of the chip device may be grouped firstly, for example, each channel group comprises N channels: channel 0, channel 1, . . . , channel (N−2), and channel (N−1). A first register $Reg_1$ having a bit width of (N+k) is set to correspond to each of the channel groups. For example, a memory space in the chip device (such as an FPGA) may be set as the first register for storing the output bit streams and recording the number of times the difference occurs, alternatively, an external storage device may also be used as the first register. Each bit in $Reg_1[(N-1):0]$ may correspond to one channel in a channel group, e.g., channel 0 corresponds to $Reg_1[0]$, channel 1 corresponds to $Reg_1[1]$, . . . , channel (N−1) corresponds to $Reg_1[(N-1)]$. Then, the same Manchester encoded m-sequence is transmitted to respective channels of the channel group, and the output bit streams of the N channels are temporarily stored on the low N bits $Reg_1[(N-1):0]$ of the first register Reg1, respectively. At the same time, comparison is performed by means of bit operations of the first register to determine whether there is a difference between the respective bits of the output bit stream and those of the input bit stream. In case a difference is obtained by comparison, the number of times the difference occurs in the N channels in this channel group is recorded by the high k bits of the first register $Reg_1$, i.e., $Reg_1[(N+k-1):N]$.

In an embodiment of the disclosure, since the number of times the difference occurs in the same channel group is allowed to be recorded by the high k bits of the first register $Reg_1$, in this embodiment, identifying a channel group for which the number of times the difference occurs is greater than a predetermined value as the abnormal channel group may comprise: in response to the number of times the difference occurs recorded by the high k bits of the first register being equal to $2^k-1$, identifying a channel group corresponding to the first register as the abnormal channel group.

In an embodiment of the disclosure, the high k bits $Reg_1[(N+k-1):N]$ of the first register $Reg_1$ are configured to record the number of times the difference occurs in the N channels in the channel group, that is, the high k bits specify a recordable maximum number of times the difference occurs in the same channel group. This maximum number may be the aforementioned predetermined value for the number of times the difference occurs. Therefore, in an example, the initial values of all the high k bits may all be assigned with "1", and each time a difference occurs, the high k bits $Reg_1[(N+k)-1):N]$ perform a "minus 1" operation. When $Reg_1[(N+k-1):N]=0$, the channel group is identified as an abnormal channel group, and each channel in the abnormal channel group will be further detected later.

Figure 6:
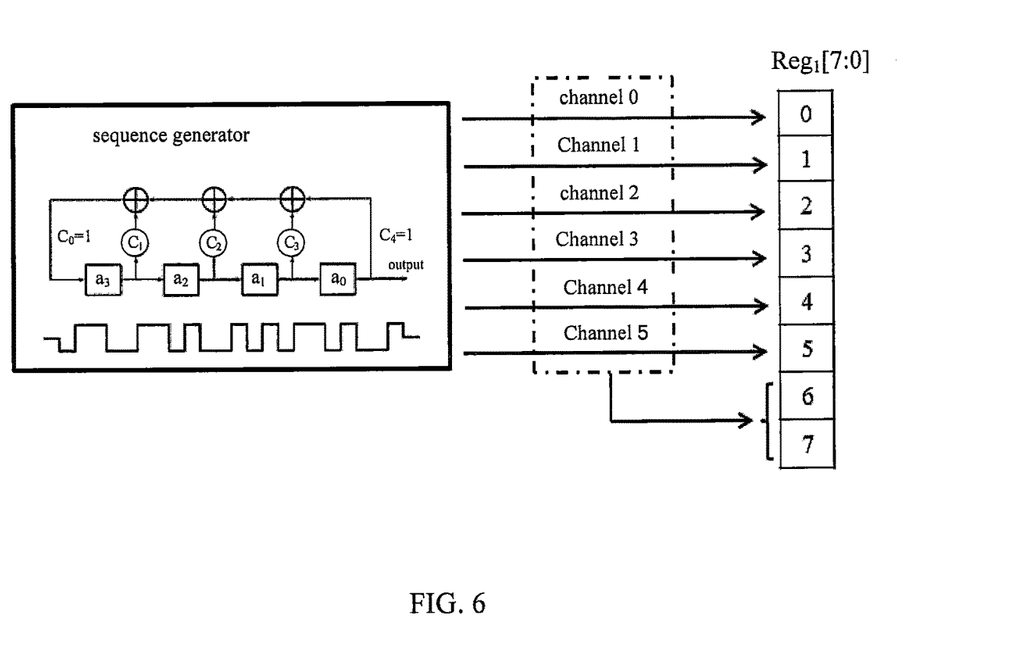
FIG. 6 is a schematic view illustrating an application scenario of recording the number of times the difference occurs in a channel group as provided by another embodiment of the present disclosure.

For example, a channel group comprises 6 channels, e.g., channel 0 to channel 5, as shown in FIG. 6, which is a schematic view showing an application scenario of recording the number of times the difference occurs in a channel group in the chip failure detection method as provided by another embodiment of the disclosure. In the application scenario shown in FIG. 6, taking N=6, k=2 as an example, the order of a sequence generator for generating the m-sequence in FIG. 6 comprises: $a_0$, $a_1$, $a_2$ and $a_3$. The difference between the output bit streams and the input bit stream in the channel group is determined by comparison and the number of times the difference occurs is recorded. In case no difference is determined, the high k bits are all "1", i.e., "11". In case the difference occurs, the counting method may be as follows: if the difference occurs once, the high k bits are changed to "10" from "11", after the difference occurs twice, the high k bits will be "01", and when the difference occurs three times, the high k bits become "00". That is, when the difference occurs 3 (i.e., $2^k-1$) times, the high k bits are all "0". At this time, the channel group can be determined as an abnormal channel group and marked.

For another example, if k is 4, in case no difference occurs, the high k bits are all "1", i.e., "1111", and if the difference occurs 15 (i.e., $2^k-1$) times, the high k bits are all "0". At this time, the channel group can be determined as an abnormal channel group and marked.

According to an embodiment of the disclosure, the value of k may be an integer greater than or equal to 1, and the value of k may be related to the sensitivity of each channel in a channel group. The value of k may be selected by also referring to the number of channels and channel groups in a chip. During the failure detection process of a chip device, due to the possibility of accidental phenomena, if a channel group is identified as an abnormal channel group due to the difference occurs once in the channel group, there may be a misjudgment in determining the abnormal channel groups. Therefore, according to another embodiment of the disclosure, the values of the high k bits in the (N+k)-bit first register are set to be integers greater than or equal to 2. That is, the number of times the difference occurs is at least 3 (corresponding to the case where k is equal to 2). This may allow the difference to occur a certain number of times in the same channel group, so as to avoid the misjudgment in determining abnormal channel groups due to the occurrence of accidental events.

It is to be noted that the above-described way of recording the number of times the difference occurs in the same channel group using the high k bits of the first register is merely illustrative, and the number of times the difference occurs in the channel group may be recorded in other ways. For example, in case no difference occurs, the high k bits of the first register are all "0". Each time a difference occurs, the high k bits perform a "plus 1" operation. When the high k bits are all "1", the channel group is determined as an abnormal channel group. The number of times the difference occurs in the channel group may also be recorded in other ways.

Figure 4:
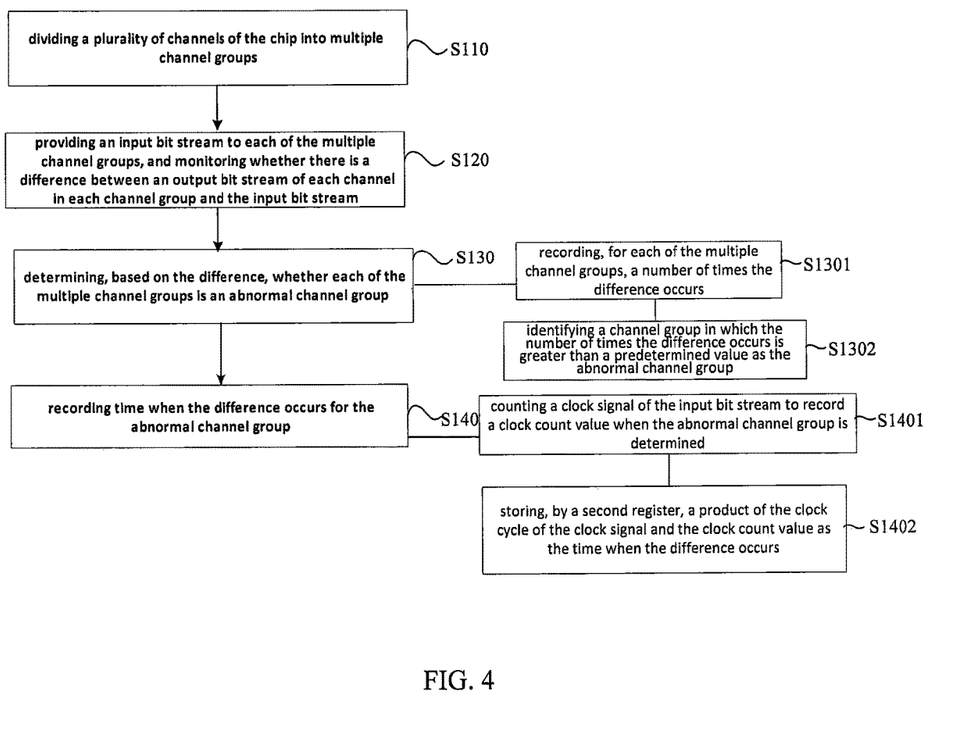
FIG. 4 is a flow chart of a method for detecting a failure of a chip as provided by another embodiment of the present disclosure.

According to an embodiment of the disclosure, recording time when the difference occurs for the abnormal channel group comprises the following steps: S1401, counting a clock signal of the input bit stream to record a clock count value when the abnormal channel group is determined; S1402, storing, by a second register, a product of the clock cycle of the clock signal and the clock count value as the time when the difference occurs, as shown in FIG. 4. In the embodiment of the disclosure, a second register $RA_i$ having a width $w_1$ may be set for a channel group to record the time when the difference occurs, that is, to store an abnormal time position when the channel group is determined as an abnormal channel group, where i represents the i-th channel group. In an example, the clock cycle of the clock signal of the input bit stream is a constant, and a variable cnt may be set for the second register to count the clock signal of the input bit stream. For example, counting is performed once for each rising edge ("0"→"1") during each clock cycle. The recorded count value is saved in the variable cnt, and when the channel group corresponding to the second register is determined as an abnormal channel group, the product of the current value of the variable cnt and the clock cycle is assigned to $RA_i$, that is, the product of the above recorded clock count value and the clock cycle, i.e., an abnormal time position, is saved.

In some embodiments, the second register only records the abnormal time position for the abnormal channel group, and therefore, the number of the second registers may be less than or equal to the number of channel groups in the chip device.

According to some embodiments of the disclosure, the channels contained in a chip device may be divided into M channel groups, and the numbers of channels contained in respective channel group of the M channel groups may be the same or different. The way of grouping the multiple channels in a chip device according to embodiments of the disclosure may be determined based on practical applications and the number of pins of the chip. For example, if pins in a certain region of a chip device are large in number and densely distributed, the channels corresponding to the pins in this region may be grouped such that each channel group may comprise a relatively small number of channels. For another example, for some channels prone to interferences, these channels may be distributed in different channel groups for detection.

According to some embodiments of the disclosure, the above-mentioned step "providing an input bit stream to each channel group of the plurality of channel groups, and monitoring whether there is a difference between an output bit stream of each channel in each channel group and the input bit stream" may comprise: providing the input bit stream to the M channel groups simultaneously, and recording, for each of the M channel groups, a number of times the difference occurs, respectively; or providing the input bit stream to the M channel groups successively, and recording, for the M channel groups, a number of times the difference occurs. In the case of providing the input bit stream to the M channel groups in the chip simultaneously, and recording, for each of the M channel groups, a number of times the difference occurs respectively, the operations of recording the number of times the difference occurs are performed simultaneously. Therefore, M first registers may be used to record the number of times the difference occurs, and each first register is used to record the number of times the difference occurs in a corresponding channel group, to achieve simultaneous detection and recording. In addition, in this case, the number of second registers may be M, and the M second registers may be configured to record the abnormal time positions for the M channel groups in one-to-one correspondence. This example can achieve a faster detection speed, but usually requires many resources (e.g., a large number of first and second registers).

According to another embodiment of the disclosure, the input bit stream may be provided to the M channel groups successively, and the number of times the difference occurs is recorded for the M channel groups. In this example, since the M channel groups are detected successively rather than simultaneously, the operations of recording the number of times the difference occurs are also performed successively. Therefore, the number of times the difference occurs can be recorded using only one or more first registers. For example, if each of the M channel groups in the chip includes a same number (e.g., N channels) of channels, only one first register may be necessary to record the number of times the difference occurs for each channel group. To take another example, if the numbers of channels in each channel group of the M channel groups in the chip are different, which may be N1, N2, N3, etc., the numbers of times the difference occurs for the M channel groups may be recorded by a plurality of first registers having different bit widths, respectively. For example, for a channel group in which the number of channels is N1, a first register having a bit width of (N1+k) is set; for a channel group in which the number of channels is N2, a first register having a bit width of (N2+k) is set; and for a channel group in which the number of channels is N3, a first register having a bit width of (N3+k) is set. In this example, the number of second registers may be one or more, which may be determined based on the number of available registers or storage resources of the chip. In this example, the detection speed is relatively slower, but fewer resources (e.g., a small number of first and second registers) are usually required.

It is to be noted that, embodiments of the present disclosure would not be limited to the above examples of the M channel groups being detected simultaneously or successively. The M channel groups can further be sorted and be detected based on the sortation. For example, a part of the channel groups are detected in a time period, and other channel groups are detected in another time period.

According to an embodiment of the disclosure, the values of the high k bits of the first registers for different channel groups may be the same or different. The above embodiment is illustrated by taking an example where k is a fixed value. In some application scenarios, the values of k of the first registers for different channel groups may be different. For example, if a certain channel group has high sensitivity, the value of the k bit is small, which allows a smaller number of times the difference occurs. If a certain channel group has low sensitivity, the value of the k bit is large, which allows a larger number of times the difference occurs.

Further, the chip failure detection method provided by the embodiment of the disclosure may further comprise: dividing channels of the abnormal channel group into a plurality of sub-channel groups; and determining an abnormal sub-channel group from the plurality of sub-channel groups; or detecting respective channels in the abnormal channel group one by one to determine an abnormal channel with a failure.

With the above embodiments of the disclosure, on the basis of identifying which channel groups of a chip device are abnormal channel groups, for a plurality of channels in one or more abnormal channel groups, single-line failure detection may be performed for these channels as needed. That is, the output bit stream of respective channel is compared with the input bit stream separately to locate the position of the abnormal channel. Alternatively, these channels in the abnormal channel group may be re-divided into channel groups including less number of channels, that is, the channel groups identified as abnormal channel groups are divided into smaller channel groups, and the previously described detection including comparison and recording operations are repeated to reduce the range of abnormality detection until a failed channel is located. In addition, it is possible to enhance the speed of detection for locating an abnormal position by only capturing signals at a time point (i.e. $RA_i$ point) when the channel group is determined to be abnormal, or signals in time periods right before and after the time point.

In the embodiments of the disclosure, the number N of channels in a channel group, and the values of the high k bits in the first register for recording the number of abnormalities can be determined according to the practical situation of the chip device. The selection of the N value is related to the hardware characteristics of the channels of the chip device, such as the number of pins, the degree of pin density, the interference, and the like. The selection of k determines an allowable maximum number of times the difference occurs in a channel group, which is related to the sensitivity of each channel in the channel group. The cnt in the second register $RA_i$ and the bit width of $RA_i$ may be set to balance resource occupation and prevent overflow. They may be determined by the length of detection time required by the user. For example, if an 8-bit width may satisfy the detection time, the bit width of $RA_i$ may be set to 10-bit, which on the one hand prevents overflow, and on the other hand extends the detection time on the basis of the user's requirement to ensure the stability of the system.

According to an embodiment of the disclosure, a bit stream generated by Manchester encoding of an m-sequence may be used as the input bit stream provided to a chip device. The input bit stream has both a statistical property of a pseudo-random sequence and a secure, stable key attribute, which meets the requirements of a high quality detection standard. The number of times the difference occurs may be recorded using the high k bits of the first register, so as to determine a channel group as an abnormal channel group when the recorded number of times the difference occurs reaches a predetermined value, and a value of the high k bits may be a positive integer greater than or equal to 2, which is helpful to exclude interference by accidental events, and beneficial to the accuracy of identifying an abnormal channel group. The second register can record a time when a channel group is identified to be abnormal, which makes it easy to backtrack and reproduce a failure, and further expedites further location of the faulted channels.

Figure 7:
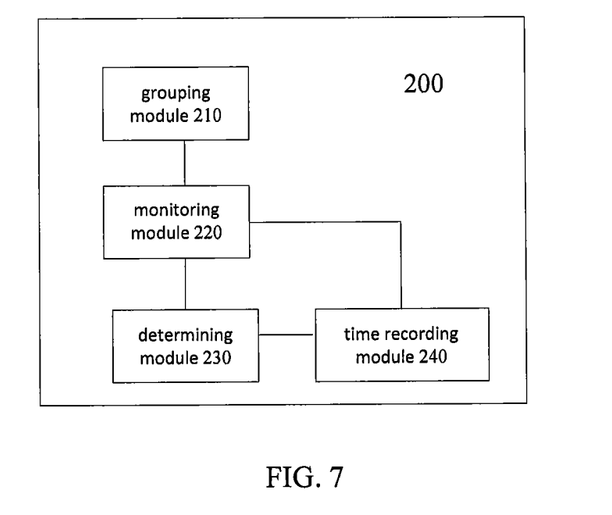
FIG. 7 is a structural schematic view of a device for detecting a failure of a chip provided by an embodiment of the present disclosure.

Another embodiment of the present disclosure provides a device for detecting a failure of a chip. FIG. 7 is a structural schematic view of the device for detecting a failure of a chip provided by an embodiment of the present disclosure. A device 200 for detecting a failure of a chip provided by this embodiment is capable of detecting and locating an abnormal state of a processor chip such as an existing AP, FPGA, and the like. The device 200 for detecting a failure of a chip may comprise: a grouping module 210 configured to divide a plurality of channels of the chip into multiple channel groups; a monitoring module 220 configured to provide an input bit stream to each channel group of the plurality of channel groups, and monitor whether there is a difference between an output bit stream of each channel in each channel group and the input bit stream, and a determining module 230 configured to determine, based on the difference, whether each group channel of multiple group channels is an abnormal channel group. According to an embodiment of the disclosure, input bit streams provided to respective channels in the same channel group are the same.

For chip devices having a large number of channels, for example, a processor chip such as an AP, an FPGA, etc, it is difficult to perform failure detection by manually testing and locating an abnormal position. These chip devices are powerful and usually have thousands of pins as well as a large number of channels. In addition, due to the package (e.g., BGA), the layout of PCB, and the leads arrangement for the chip device, it is difficult to perform detection with a multimeter or an oscilloscope by connecting a probe. As a result, in case an abnormality occurs in the chip device, the implementability of manually detecting and locating an abnormal positon is very poor.

The device 200 for detecting a failure of a chip provided by the embodiment of the disclosure is capable of detecting a plurality of channels inside a chip group by group. For example, the grouping module divides the channels in the chip into mulitiple channel groups, each of which comprises a plurality of channels, and bit streams are input to these channel groups for detection.

According to some embodiments of the disclosure, a chip (for example, an FPGA) may be connected to a measurement device through an emulator. The measurement device is for example a computer, and the above-described grouping module, monitoring module, and determining module may be integrated in the computer. In particular, the grouping module, the monitoring module and the determining module may be implemented in the form of a combination of hardware and software, or may be implemented in pure software, which are constituent parts of the measurement device. For example, the grouping module may comprise a channel identification circuit that acquires the total number of channels inside the chip and divides all the channels into several channel groups. The monitoring module comprises an input bit stream generation circuit and a comparison circuit. The, input bit stream generation circuit (e.g., comprising a shift register with linear feedback and an encoding circuit) can generate the input bit streams to be provided to respective channel groups, and the comparison circuit can compare an output bit stream of each channel in each channel group with a corresponding input bit stream to thereby determine whether there is a difference between the input bit stream and the output bit stream. The determining module can store a predetermined determination rule implemented in the form of software, and determine on this basis whether each channel group is an abnormal channel group.

In some embodiments, the monitoring module 220 provides the same bit stream to a plurality of channels in the same channel group, and the input bit streams for the plurality of channels in the same channel group are provided simultaneously. Accordingly, the output bit streams of the plurality of channels in the same channel group may be output simultaneously. The above input bit stream is known input data, and the output bit streams of the plurality of channels in the same channel group may be somewhat different from the input bit stream due to some reasons. In an embodiment, the monitoring module may comprise a difference times recording sub-module for recording the number of times the difference occurs between the output bit stream of each channel in the channel group and the input bit stream, and the monitoring module determines whether the channel group is an abnormal channel group based on the number of times the difference occurs. For example, if the monitoring module determines that the number of times the difference occurs in a certain channel group exceeds a predetermined value, the determining module determines this channel group as an abnormal channel group. By comparing the output bit stream of each channel group with the input bit stream and determining whether there is a difference between the output bit stream and the input bit stream, the failure detection device 200 can detect each channel group in the chip device and identify the abnormal channel group. With the failure detection device 200 provided by the embodiment of the present disclosure to detect an abnormal channel in a chip device, the range of locating the abnormal channel can be greatly reduced.

In some embodiments, the difference times recording sub-module in the monitoring module may be configured in the chip (for example, an FPGA), and implemented by a memory space and an operator inside the chip. Alternatively, it may be an external storage device having a bit operation capability for comparing the bit streams. In this case, the external storage device may be connected to a measurement device, and the measurement device performs the determination of an abnormal channel group.

In an embodiment of the disclosure, the comparison circuit in the monitoring module compares the output bit stream and the input bit stream for the same channel group. For the same channel group, input bit streams provided to the plurality of channels in this channel group are the same, and these input bit streams are also input simultaneously, that is, the timing of the input bit stream of each channel in this channel group is the same. The output bit stream of each channel in this channel group needs to be compared with the input bit stream. Therefore, in the above example, the input bit stream may be considered a reference bit stream, the reference bit stream is input to each channel in the same channel group, and the output bit streams may be different from the input bit stream at a certain point in time due to factors such as clock problems, channel abnormalities, processing to bit streams by channel, etc., that is, a difference occurs. Therefore, the comparison between the output bit stream and the input bit stream is performed for the same channel group, for which the input bit stream are provided simultaneously and identical. A difference is recorded as long as the output bit stream of any channel in this channel group is different from the input bit stream. That is, the number of times the difference occurs is recorded for the entire channel group, not for a certain channel. In addition, embodiments of the disclosure do not limit the forms of input bit streams for different channel groups, that is, the bit streams input to different channel groups may be the same or different.

In some embodiments, the difference times recording sub-module in the monitoring module records the number of times the difference occurs for each of the plurality of channel groups, and the determining module identifies a channel group for which the number of times the difference occurs is greater than a predetermined value as the abnormal channel group. For example, the monitoring module can provide the same input bit stream to a plurality of channels in the same channel group among a plurality of channel groups of the chip device, and detect the input bit stream and the output bit streams to record the number of times the output bit streams of a plurality of channels in each channel group differ from the input bit stream. When the recorded number of times the difference occurs in a channel group exceeds a predetermined value, this channel group is determined as an abnormal channel group, thereby reducing the range of locating an abnormal channel in the chip device.

According to another embodiment of the disclosure, as shown in FIG. 7, the device for detecting a failure of a chip may further comprise a time recording module 240 configured to record the time when the difference occurs for the abnormal channel group. According to an embodiment of the disclosure, the difference times recording sub-module records the number of times the difference occurs between the output bit streams of a plurality of channels in the same channel group and the input bit stream by comparison. When the determining module determines a certain channel group to be an abnormal channel group, the time (also referred to as an abnormal time position) when the difference occurs in this channel group can be further recorded by the time recording module. In the embodiment of the disclosure, recording the time when the difference occurs in the channel group by the time recording module 240 can reduce the range of time to be detected when locating a specific faulted channel subsequently. For example, at the time of further detecting the abnormal channel group subsequently, it is possible to detect signals of time periods right before and after the recorded abnormal time position, so that subsequent location of an abnormal position can be expedited. In addition, if the previously recorded abnormality does not reappear during subsequent detection, the event occurring at the recorded abnormal time position may be considered to analyze the cause of the abnormality.

In some embodiments, the bit stream generation circuit in the monitoring module encodes a pseudo-random sequence to generate an input bit stream that is provided for a channel group of a chip device.

An exemplary process for generating the bit stream in an embodiment of the disclosure is illustrated in FIG. 3. For example, Manchester encoding is performed for an m-sequence to generate the input bit streams to be provided to a plurality of channel groups of a chip device. The characteristics of the generated bit stream and the beneficial effects of its application for chip failure detection in embodiments of the disclosure have been described in detail in the foregoing embodiments, and are thus not described herein again. The bit stream generation circuit may comprise a linear feedback shift register for generating a pseudo-random sequence and an encoder for performing encoding. The bit stream generation circuit may be integrated in the measurement device, and may also be an external device of the measurement device.

In an embodiment of the disclosure, each channel group comprises N channels, and the difference times recording sub-module may be a first register having a bit width of (N+k). The high k bits of the first register may be configured to record the number of times the difference occurs in N channels of each channel group, and the low N bits of the first register is configured to store output bit streams of the N channels. In an embodiment, when the number of times the difference occurs recorded by the high k bits of the first register is equal to a difference threshold $2^k-1$, the channel group is determined to be an abnormal channel group.

In an embodiment of the disclosure, the time recording module may be a second register $RA_i$ having a bit width of $w_1$, and the second register is used to record the time when the difference occurs in an abnormal channel group. In particular, the second register may count the clock signal of the input bit stream to record the clock count value when the abnormal channel group is determined, and store the product of the clock cycle of the clock signal of the input bit stream and the clock count value as the time when the difference occurs.

In an embodiment of the present disclosure, the value of k may be an integer greater than or equal to 2, and the value of k is related to the sensitivity of each channel in a channel group, and the number of channels and channel groups in the chip may be considered when determining the value of k. During the failure detection process of a chip device by the failure detection device 200 provided by the embodiment of the disclosure, due to the possibility of accidental events, if a channel group is identified as an abnormal channel group as long as the difference occurs once in the channel group, there may be a misjudgment in determining the abnormal channel groups. Therefore, by setting the value of the high k bits in the (N+k)-bit first register to be an integer greater than or equal to 2, which means the number of times the difference occurs is at least 3, the embodiment of the disclosure allows the difference to occur a certain number of times in the same channel group, so as to avoid the misjudgment in determining the abnormal channel groups due to the occurrence of accidental events.

In addition, similar to the difference times recording sub-module, the time recording module 240 may be configured in a chip, and implemented by a memory space inside the chip, alternatively, it may be an external storage device. At this time, the external storage device may be further connected to the measurement device which calculates the abnormal time position according to the recorded count value and the clock cycle.

Figure 8:
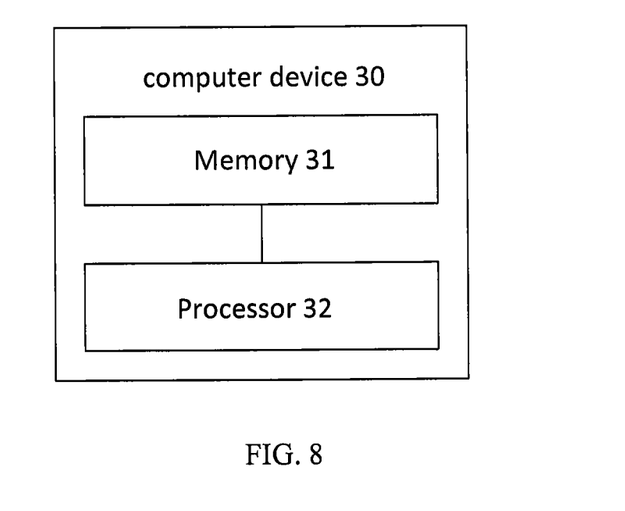
FIG. 8 is a structural schematic view of a computer device provided by an embodiment of the present disclosure.

A further embodiment of the disclosure provides a detection apparatus. The detection apparatus comprises a processor configured to execute the method for detecting a failure of a chip as described in any of the foregoing embodiments. The detection apparatus may be a computer device. FIG. 8 is a structural schematic view of a computer device provided by an embodiment of the disclosure. A computer device 30 provided by the embodiment of the disclosure may comprise a memory 31 and a processor 32. The memory 31 is configured to save executable instructions. The processor 32 is configured to implement the method for detecting a failure of a chip provided by any of the foregoing embodiments of the disclosure when executing the executable instructions saved by the memory 31.

The computer device 30 provided by the embodiment of the present disclosure is capable of detecting and locating an abnormal state of a core processing chip device such as an AP, an FPGA, etc. The implementation of the computer device 30 is substantially similar to the method for detecting a failure of a chip provided by the foregoing embodiments of the present disclosure, which will not be described herein.

An embodiment of the present disclosure further provides a storage medium comprising executable instructions, the executable instructions, when executed by the processor, can implement the method for detecting a failure of a chip provided by any of the foregoing embodiments of the disclosure. The implementation principle of the storage medium provided by the embodiment of the disclosure is substantially the same as the method for detecting a failure of a chip provided by the foregoing embodiments of the present disclosure, which will not be described herein.

A person having ordinary skill in the art will appreciate that all or some of the steps in the method, the system, and functional modules/units in the device as described above may be implemented as software, firmware, hardware, and suitable combinations thereof. In case of a hardware implementation, the functional modules/units mentioned in the above description does not necessarily correspond to physical components. For example, one physical component may have multiple functions, or one function or step may be executed by several physical components in cooperation with each other. Some or all of the components may be implemented as software executed by a processor such as a digital signal processor or microprocessor, or as hardware, or as an integrated circuit such as a dedicated integrated circuit. Such software may be distributed on a computer readable medium which may include a computer storage medium (or non-transitory medium) and a communication medium (or transitory medium). As is well known to the person having ordinary skill in the art, the term "computer storage medium" includes volatile and nonvolatile, removable and non-removable medium implemented in any method or technology for storing information such as computer readable instructions, data structures, program modules or other data. The computer storage medium includes, but is not limited to, RAM, ROM, EEPROM, flash memory or other memory technologies, CD-ROM, digital versatile disc (DVD) or other optical disc storages, magnetic cartridge, magnetic tape, magnetic disk storage or other magnetic storage devices, or any other medium that can be used to store desired information and can be accessed by a computer. Moreover, it is well known to the person having ordinary skill in the art that communication medium typically includes computer readable instructions, data structures, program modules, or other data in a modulated data signal such as a carrier wave or other transfer mechanism, and may include any information delivery medium.

The above contents are merely exemplary embodiments shown to facilitate the understanding of the disclosure and are not intended to limit the scope of the present application. The person having an ordinary skill in the art can make any modifications and variations to the implementation and details of the embodiments without departing from the spirit and scope revealed by the disclosure to thereby obtain further embodiments different from the embodiments herein. These further embodiments also fall within the scope of the present application.

The invention claimed is:

1. A method for detecting a failure of a chip, comprising:
   dividing a plurality of channels of the chip into multiple channel groups;
   providing an input bit stream to each channel group of the multiple channel groups; and
   monitoring whether there is a difference between an output bit stream of each channel in a respective channel group and the input bit stream, wherein input bit streams provided to respective channels of a same channel group are identical; and
   determining, based on the difference, whether each channel group of the multiple channel groups is an abnormal channel group.

2. The method according to claim 1, wherein the monitoring whether there is the difference comprises:
   comparing the input bit stream with the output bit stream of each channel in the respective channel group under a same clock signal,
   wherein the difference indicates that the input bit stream is different from the output bit stream within a single clock cycle of the same clock signal.

3. The method according to claim 2, wherein the determining, based on the difference, whether each channel group of the multiple channel groups is the abnormal channel group comprises:
   recording, for each channel group of the multiple channel groups, a number of times the difference occurs; and
   identifying a channel group among the multiple channel groups in which the number of times the difference occurs is greater than a predetermined value as the abnormal channel group.

4. The method according to claim 3, wherein each channel group of the multiple channel groups comprises N channels, wherein the recording, for each channel group of the multiple channel groups, the number of times the difference occurs comprises:
   recording the number of times the difference occurs in the N channels of each channel group by high k bits of a first register having a bit width of (N+k); and
   storing output bit streams of the N channels by low N bits of the first register,
   wherein N is an integer greater than or equal to 2, and
   wherein k is an integer greater than or equal to 1.

5. The method according to claim 4, wherein the identifying the channel group among the multiple channel groups in which the number of times the difference occurs is greater than the predetermined value as the abnormal channel group comprises:

in response to the number of times the difference occurs recorded by the high k bits of the first register being equal to $2^k-1$, identifying the channel group corresponding to the first register as the abnormal channel group.

6. The method according to claim 4, wherein the k is an integer greater than or equal to 2.

7. The method according to claim 1, further comprising:
recording a time when the difference occurs for the abnormal channel group.

8. The method according to claim 7, wherein the recording the time when the difference occurs for the abnormal channel group comprises:

counting a clock signal of the input bit stream to record a clock count value when the abnormal channel group is determined; and storing, by a second register, a product of a clock cycle of the clock signal and the clock count value as the time when the difference occurs.

9. The method according to claim 1, wherein the plurality of channels of the chip are divided into M channel groups, wherein the providing the input bit stream to each channel group of the multiple channel groups and the monitoring whether there is the difference between the output bit stream of each channel in the channel group and the input bit stream comprises:

providing the input bit stream to the M channel groups simultaneously, and recording a number of times the difference occurs for each channel group of the M channel groups, respectively; or providing the input bit stream to the M channel groups successively, and recording a number of times the difference occurs for the M channel groups.

10. The method according to claim 1, further comprising:
dividing channels of the abnormal channel group into a plurality of sub-channel groups; and
detecting an abnormal sub-channel group from the plurality of sub-channel groups.

11. The method according to claim 1, further comprising:
detecting respective channels of the abnormal channel group one by one to determine an abnormal channel where a failure occurs.

12. The method according to claim 1, further comprising:
encoding a pseudo-random sequence to generate the input bit stream that is provided to each channel group of the multiple channel groups.

13. The method according to claim 12, wherein the encoding the pseudo-random sequence to generate the input bit stream that is provided to each channel group of the multiple channel groups comprises:

performing Manchester encoding for an m-sequence to generate the input bit stream.

14. A detection apparatus comprising a processor, wherein the processor is configured to execute the method according to claim 1.

15. A non-transitory computer readable storage medium comprising executable instructions, wherein the executable instructions, when executed by a processor, implement the method according to claim 1.

16. A device for detecting a failure of a chip, comprising:
a channel identification circuit configured to divide a plurality of channels of the chip into multiple channel groups;
a input bit stream generation circuit configured to provide an input bit stream to each channel group of the multiple channel groups and configured to monitor whether there is a difference between an output bit stream of each channel in the channel group and the input bit stream; and
a determining circuit configured to determine, based on the difference, whether each channel group of the multiple channel groups is an abnormal channel group.

17. The device according to claim 16, further comprising:
a time recording register configured to record a time when the difference occurs for the abnormal channel group.

* * * * *